(12) United States Patent
Elliott (10) Patent No.: US 11,691,754 B2
(45) Date of Patent: Jul. 4, 2023

(54) SYSTEM AND METHOD FOR OPERATING A POWER DISTRIBUTION SYSTEM

(71) Applicant: GE Aviation Systems Limited, Cheltenham (GB)

(72) Inventor: David Alan Elliott, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 0 days.

(21) Appl. No.: 17/522,502

(22) Filed: Nov. 9, 2021

(65) Prior Publication Data

US 2022/0153428 A1 May 19, 2022

(30) Foreign Application Priority Data

Nov. 18, 2020 (GB) ...................... 2018124

(51) Int. Cl.
*B64D 41/00* (2006.01)
*H02J 3/14* (2006.01)
*H02J 4/00* (2006.01)

(52) U.S. Cl.
CPC ............... *B64D 41/00* (2013.01); *H02J 3/14* (2013.01); *H02J 4/00* (2013.01); *B64D 2221/00* (2013.01); *H02J 2310/44* (2020.01); *H02J 2310/60* (2020.01)

(58) Field of Classification Search
CPC ....... B64D 2221/00; B64D 41/00; H02J 4/00; H02J 2310/44; H02J 2310/60; H02J 1/06; H02H 1/0007; H02H 7/20; H02H 1/06; H03K 2217/0036; H03K 17/002; H03K 17/56
See application file for complete search history.

(56) References Cited

U.S. PATENT DOCUMENTS

| 7,538,454 | B2 | 5/2009 | Yu et al. |
| 7,598,625 | B2 | 10/2009 | Yu et al. |
| 7,936,084 | B2 | 5/2011 | Serventi et al. |
| 8,861,162 | B2 | 10/2014 | Fuller et al. |
| 8,928,185 | B2 | 1/2015 | Greither |
| 9,327,600 | B1 | 5/2016 | Nehmeh |
| 10,560,087 | B2 | 2/2020 | Handy et al. |
| 2012/0049935 | A1 | 3/2012 | Greither |

(Continued)

FOREIGN PATENT DOCUMENTS

| CN | 103415975 A | * 11/2013 | ................ H02J 3/38 |
| EP | 3154143 A1 | 4/2017 | |

*Primary Examiner* — Ryan Johnson
(74) *Attorney, Agent, or Firm* — McGarry Bair PC (57) ABSTRACT

A method and power distribution system for operating in a low power consumption mode includes a primary power distribution node defining a primary distribution switch having an output and operable in a first conducting mode and a second non-conducting mode, and wherein operating in the second non-conducting mode includes a leakage current through the power distribution switch, at least one enabled electrical load downstream of the primary power distribution node, the at least one enabled electrical load connectable to the primary power distribution node by way of the primary distribution switch, and a primary power distribution node power source configured to supply power to the output of the primary distribution switch when the primary distribution switch is operating in the second non-conducting mode.

20 Claims, 5 Drawing Sheets

(56) References Cited

U.S. PATENT DOCUMENTS

| | | | |
|---|---|---|---|
| 2018/0145677 A1* | 5/2018 | Handy | H02M 7/06 |
| 2018/0226789 A1* | 8/2018 | Elliott | H02H 3/08 |
| 2018/0294652 A1 | 10/2018 | Loefflad | |
| 2018/0348794 A1 | 12/2018 | Berkley et al. | |
| 2019/0214812 A1 | 7/2019 | Elliott | |

* cited by examiner

SYSTEM AND METHOD FOR OPERATING A POWER DISTRIBUTION SYSTEM

CROSS REFERENCE TO RELATED APPLICATION(S)

This application claims priority to and benefit of GB Patent Application No. 2018124.4 filed Nov. 18, 2020, which is incorporated herein in its entirety.

TECHNICAL FIELD

The disclosure relates to a method and system for operating a power distribution system.

BACKGROUND

Electrical power systems, such as those found in an aircraft power distribution system, employ power generating systems or power sources, such as generators, for generating electricity for powering the systems and subsystems of the aircraft. As the electricity traverses electrical bus bars to deliver power from power sources to electrical loads, power distribution nodes dispersed throughout the power system ensure the power delivered to the electrical loads meets the designed power criteria for the loads. Power distribution nodes can, for instance, further provide switching operations to selectively enable or disable the delivery of power to particular electrical loads, depending on, for example, available power distribution supply, criticality of electrical load functionality, or aircraft mode of operation, such as take-off, cruise, or ground operations.

BRIEF DESCRIPTION

In one aspect, the disclosure relates to a power distribution system, including a primary power distribution node defining a set of primary distribution switches, each having an output and operable in a first conducting mode and a second non-conducting mode, and wherein operating in the second non-conducting mode includes a leakage current through the power distribution switch, and including a primary power distribution node power source configured to receive a first power, and supply a second power to an output, the second power less than the first power, and a controller module associated with the primary power distribution node and configured to identify a subset of electrical loads desired to be energized during an idle state of the power distribution system, defining a set of enabled electrical loads, identify a subset of secondary power distribution nodes not associated with any of the set of enabled electrical loads, switchably disconnect the subset of secondary power distribution nodes from a limited power supply, by way of opening a subset of the primary distribution switches positioned in a primary power distribution node upstream of the respective subset of secondary power distribution nodes, and supply the second power to the output of the opened primary power distribution switch, wherein the second power reduces leakage current across the respective primary distribution switch.

In another aspect, the disclosure relates to a method of reducing leakage current in a power distribution system, including identifying a subset of electrical loads desired to be energized during an idle state of the power distribution system, defining a set of enabled electrical loads, identifying a subset of secondary power distribution nodes not associated with any of the set of enabled electrical loads, switchably disconnecting the subset of secondary power distribution nodes from a limited power supply, by way of opening a primary distribution switch positioned in a primary power distribution node upstream of the subset of secondary power distribution nodes, and supplying a low voltage power supply to the output of the opened primary power distribution switch, wherein the low voltage power supply reduces leakage current across the primary distribution switch.

In yet another aspect, the disclosure relates to a power distribution system, including a primary power distribution node defining a set of primary distribution switches, each having an output and operable in a first conducting mode and a second non-conducting mode, and wherein operating in the second non-conducting mode includes a leakage current through the power distribution switch, and including a primary power distribution node power source configured to receive a first power, and supply a second power to an output, the second power less than the first power, a first secondary power distribution node including at least one enabled electrical load operable in a low power consumption mode of the power distribution system, the first secondary power distribution node connectable to the primary power distribution node by a first primary distribution switch, and a second secondary power distribution node not associated without any enabled electrical loads operable in the low power consumption mode of the power distribution system, the second secondary power distribution node connectable to the primary power distribution node by a second primary distribution switch. In response to the power distribution system operating in the low power consumption mode, the second secondary power distribution node is selectively disconnected from a power distribution system power source, and wherein the primary power distribution node power source supplies the second power to the second secondary power distribution node to operably reduce the leakage current through the second primary distribution switch.

These and other features, aspects and advantages of the present disclosure will become better understood with reference to the following description and appended claims. The accompanying drawings, which are incorporated in and constitute a part of this specification, illustrate aspects of the disclosure and, together with the description, serve to explain the principles of the disclosure.

BRIEF DESCRIPTION OF THE DRAWINGS

A full and enabling disclosure of the present description, including the best mode thereof, directed to one of ordinary skill in the art, is set forth in the specification, which makes reference to the appended figures, in which.

DETAILED DESCRIPTION

Aspects of the present disclosure are described herein in the context of a power source in an aircraft, which enables production of electrical power from an energy source such as a turbine engine, jet fuel, hydrogen, batteries, etc. However, it will be understood that the disclosure is not so limited and has general applicability to power distribution systems in non-aircraft applications, including other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation and distribution facilities or infrastructure.

Specifically, aspects of the disclosure can be applicable to power distribution systems having a limited supply power source or a limited power source. As used herein, a "limited power source" can include any power source that is limited in supplying an amount or quantity of power over a period of time by way of, for example, a discharge cycle of operation. Limited power sources can include, but are not limited to, fuel cell systems, hydrogen cell systems, capacitors, super capacitors, battery systems, rechargeable systems, banks of any of the preceding examples, or combinations thereof. In another non-limiting example, a limited power source can include a power source that can be depleted, yet inconvenient or impractical to recharge or replenish (e.g. no active replenishing power source, or only intermittent replenishing power sources are available). In another non-limiting example, "limited power sources" can further be limited by a timing aspect associated with an energy supplying cycle of operation. For example, batteries may have a limited effective discharge timing cycle until a potential voltage drops below a threshold value, while in another example, solar or photovoltaic cells can only generate power during limited times of a solar cycle. In this sense, limited power sources can include wind-generated energy, photonic energy sources, or the like, that have a limited effective power generation period or cycle. In yet another non-limiting example, "limited power sources" can include a combination of time-limited sources in combination with discharge-limited sources (e.g. solar power utilized to charge a battery bank that is discharged during night).

In contrast to "limited power sources," "constant power sources," or "unlimited power sources" can include power sources that are capable or configured to generate a predicted or predetermined quantity of power during expected operation of the power distribution system. In one non-limiting example, a constant power source can include a generator system that generates power in response to kinetic motion of a combustion engine, or a connection to a continuous power source such as a ground based power utility. Thus, as used herein, a constant power source is not limited by a discharge cycle.

As used herein, the term "set" or a "set" of elements can be any number of elements, including only one. As used herein, the term "upstream" refers to a direction that is opposite the electrical, power, or current flow direction, and the term "downstream" refers to a direction that is in the same direction as the electrical, power, or current flow direction.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Additionally, while terms such as "voltage", "current", and "power" can be used herein, it will be evident to one skilled in the art that these terms can be interrelated when describing aspects of the electrical circuit, or circuit operations.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

As used herein, a controllable switching element, or a "switch" is an electrical device that can be controllable to toggle between a first mode of operation or first mode, wherein the switch is "closed" intending to transmit current from a switch input to a switch output, and a second mode of operation or second mode, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The disclosure can be implemented in any electrical circuit environment having a switch. A non-limiting example of an electrical circuit environment that can include aspects of the disclosure can include an aircraft power system architecture, which enables production of electrical power from at least one spool of a turbine engine, preferably a gas turbine engine, and delivers the electrical power to a set of electrical loads via at least one solid state switch, such as a solid state power controller (SSPC) switching device. One non-limiting example of the SSPC can include a silicon carbide (SiC) or Gallium Nitride (GaN) based, high power switch. SiC or GaN can be selected based on their solid state material construction, their ability to handle high voltages and large power levels in smaller and lighter form factors, and their high speed switching ability to perform electrical operations very quickly. Additional switching devices or additional silicon-based power switches can be included.

Figure 1:
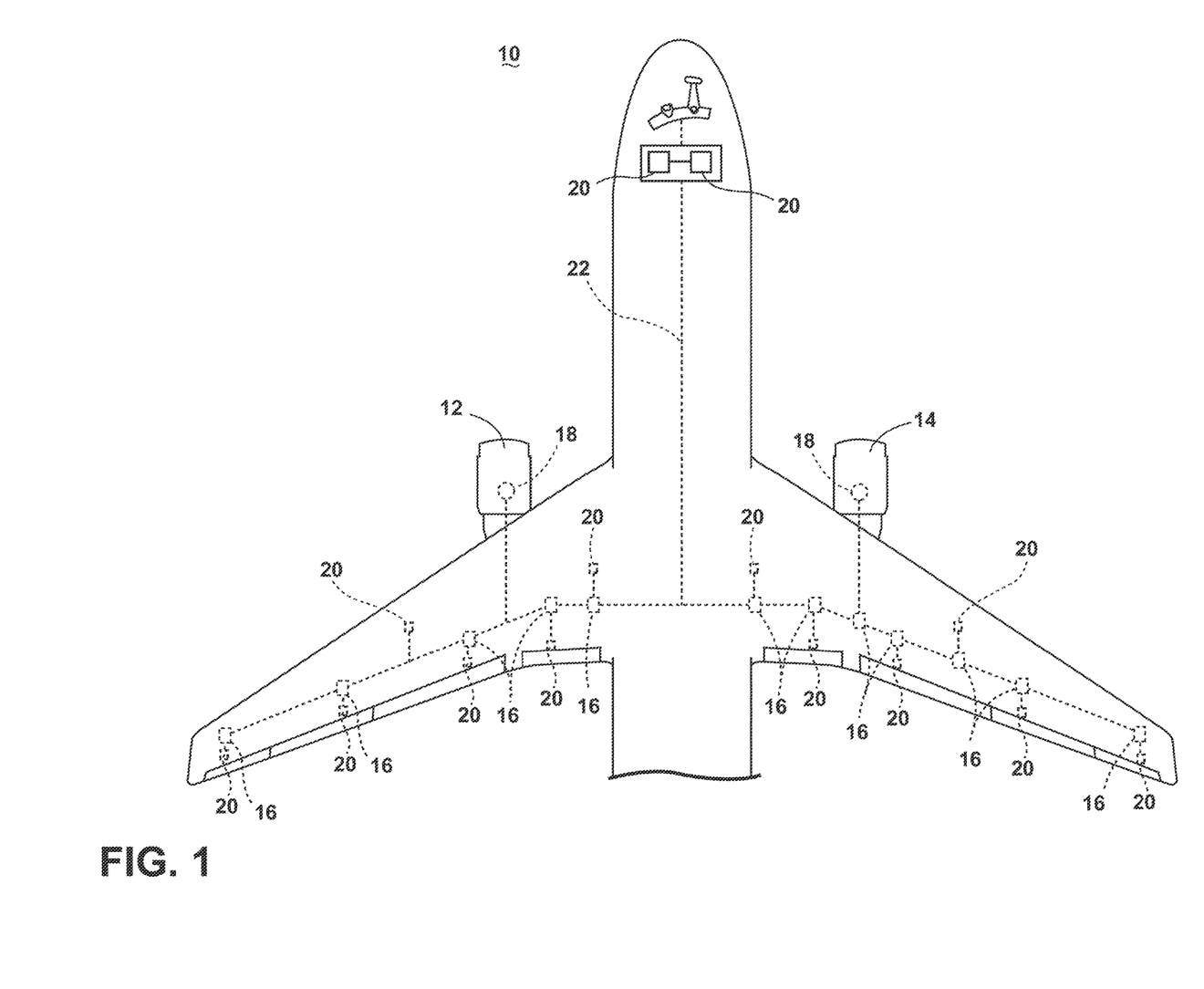
FIG. 1 is a top-down schematic view of an aircraft and power distribution system in accordance with various aspects described herein.

Referring now to FIG. 1, an aircraft 10 is shown having at least one turbine engine, shown as a left engine system 12 and a right engine system 14. Alternatively, the power system can have fewer or additional engine systems. The left and right engine systems 12, 14 can be substantially identical, and can further include at least one power source, such as a set of respective generators 18. The left and right engine systems 12, 14 can further include another respective power source, such as a second electric machine or set of generators (not shown). Non-limiting aspects of the disclosure can be included wherein, for example, the left engine system 12 includes a first generator 18 as a primary power source and a secondary generator as a secondary, back-up, or redundant power source. The aircraft is shown further having a set of power-consuming components, or electrical loads 20, such as for instance, an actuator load, flight critical loads, and non-flight critical loads.

The electrical loads 20 are electrically coupled with at least one of the generators 18 via a power distribution system including, for instance, power transmission lines or bus bars (i.e. a power bus 22), and a set of power distribution nodes 16. The aircraft 10 can further include a set of supplemental power sources (not shown) selectably connectable with the power bus 22, and operable to provide at least a portion of primary power, supplemental power, redundant power, backup power, emergency power, or the like. Non-limiting examples of the supplemental power sources can include, but are not limited to, dischargeable or rechargeable sources of electrical energy, such as fuel cells, batteries, capacitors, supercapacitors, energy source "banks" of a set of devices, or any other source of electrical power. The set of supplemental power sources can provide power to the power bus 22, and thus, the set of power distribution nodes 16 or the set of electrical loads 20.

During typical operations of the aircraft 10, the operating left and right engine systems 12, 14 provide mechanical energy which can be extracted, typically via a spool, to provide a driving force for the set of generators 18. The set of generators 18, in turn, generate power, such as AC or DC power, and provides the generated power to the power bus 22, which delivers the power to the electrical loads 20, positioned throughout the aircraft 10. Furthermore, during typical operations of the aircraft 10, the set of supplemental power sources can be selectably connected with the power bus 22, and operable to provide primary or supplemental power to a subset of the electrical loads 20.

Additional operational considerations can be included in the power distribution system during non-flight or non-typical operations of the aircraft 10. For example, when or while the aircraft 10 is parked on the ground or stored in an idle state, the aircraft engine systems 12, 14 are not typically operating or running. As used herein, an "idle state" can include any non-operational state (e.g. such as flying or operational in preparation for flying), whether intentionally or unintentionally non-operational, such as temporary or extended storage, under maintenance operations, delayed operation, or the like. Without operational engine systems 12, 14, and correspondingly, the operation of the generators 18 that are mechanically driven by the engine systems 12, 14, the power supply desires or demands of the power distribution system can be satisfied or met by way of the set of supplemental power sources. In this sense, the set of supplemental power sources are not dependent on the typical operation of the aircraft 10, and can be operational independent of the aircraft 10. Non-limiting examples of the set of supplemental power source can also include limited power sources, as explained herein.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. During emergency or inadequate periods of electrical power generation, including but not limited to engine or generator failure, at least one of the supplemental power sources 24 can be operated, enabled, or connected for providing power to the electrical loads 20. Additional management functions can be included.

During periods of an idle state, a portion of the set of electrical loads 20 can be operably or electrically disabled (e.g. turned off) in order to conserve electrical power being supplied by the limited power sources, by way of the power distribution system. Conversely, a subset of electrical loads 20, such as a predetermined subset of electrical loads 20, can be energized, enabled, active, or otherwise on "standby" for operation, despite the idle state. For example, the predetermined subset of electrical loads 20 can include electrical loads 20 utilized despite the idle state of the aircraft 10 or power distribution system. Non-limiting examples of electrical loads 20 being utilized despite the idle state can include always-on electrical loads 20, security monitoring electrical loads 20, power operated access electrical loads 20 (e.g. doors, panels, or the like), lighting electrical loads 20, monitoring electrical loads 20, remote controllable electrical loads 20, or the like. In this sense, electrical loads 20 being utilized despite the idle state can be considered "enabled electrical loads" during the idle state. As previously described, the enabled electrical loads can be predetermined.

It will be understood that while aspects of the disclosure are shown in an aircraft environment of FIG. 1, the disclosure is not so limited and can have applicability in a variety of environments. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations.

Furthermore, the number of, and placement of, the various components depicted in FIG. 1 are also non-limiting examples of aspects associated with the disclosure. For example, while various components have been illustrated with relative position of the aircraft 10 (e.g. the electrical loads 20 on the wings of the aircraft 10, etc.), aspects of the disclosure are not so limited, and the components are not so limited based on their schematic depictions. Additional aircraft 10 configurations are envisioned.

Figure 2:
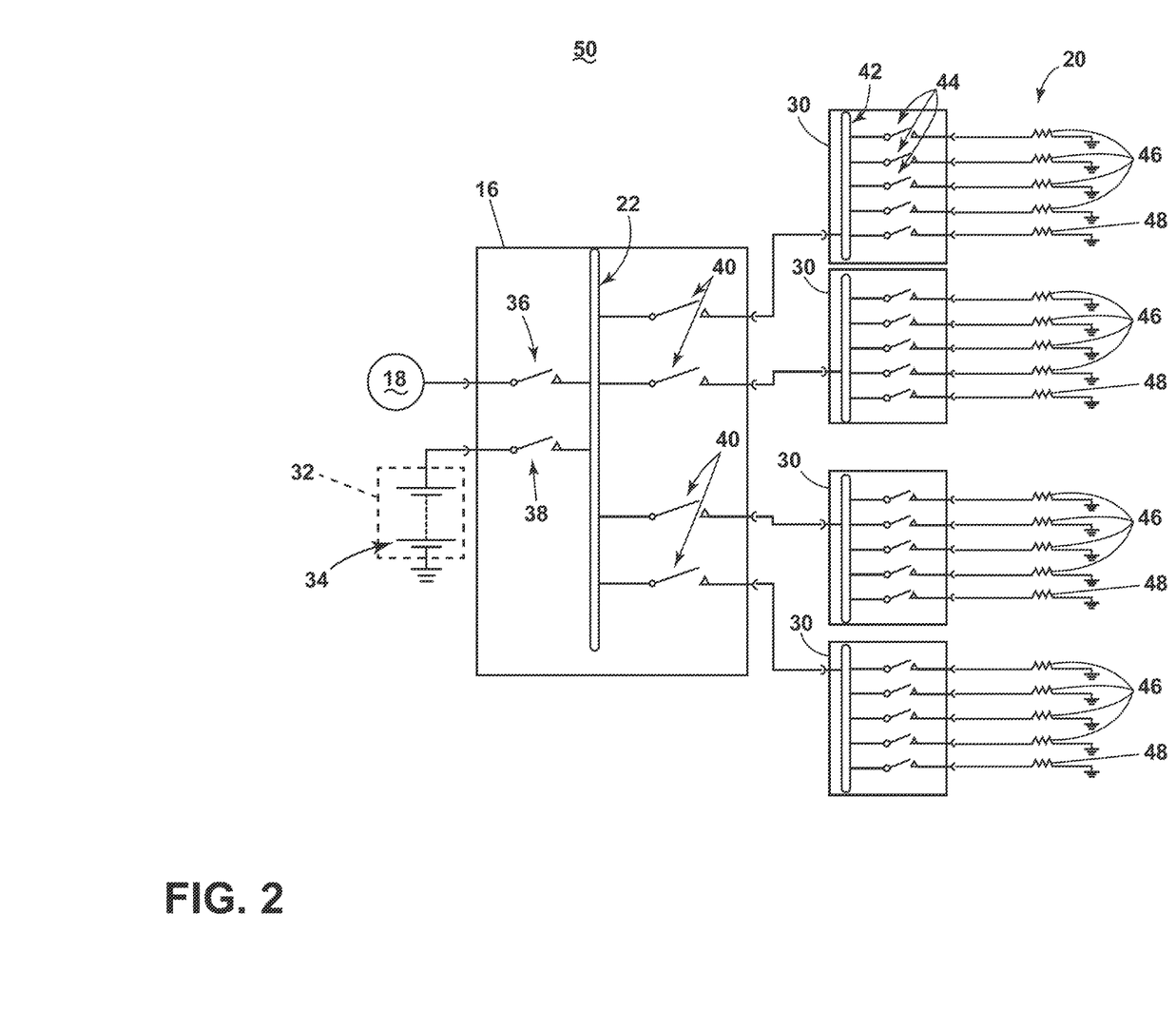
FIG. 2 is a schematic view of the power distribution system of the aircraft of FIG. 1, in accordance with various aspects described herein.

Referring now to FIG. 2, a schematic illustration is shown of an exemplary power distribution system 50 that can be utilized in the aircraft 10. The power distribution system 50 is shown having a set of power sources, such as the one or more of generators 18, a dischargeable or otherwise limited power source, such as supplemental power unit 32, the like, or a combination thereof. As shown, in one non-limiting example, the supplemental power unit 32 can include a set of batteries 34. While a set of batteries 34 are shown, the supplemental power unit 32 can include any number or combination of power sources including limited power sources, as described herein. Each of the generator 18 and supplemental power unit 32 are connected with the primary distribution power bus 22 (e.g. such as the power bus 22 of FIG. 1) of the primary power distribution node 16 (e.g. the power distribution node 16 of FIG. 1) by way of a respective switchable element, shown as a respective generator switch 36 and a supplemental power unit switch 38. In this sense, each of the generator 18 or supplemental power unit 32 can be independently connectable to supply or otherwise energize the primary distribution power bus 22.

The primary power distribution node 16 can include a number of outputs connected with a respective set or subset of secondary power distribution nodes 30 to define a hierarchical topology for the power distribution system 50. In non-limiting examples, each output connectable with a respective secondary power distribution node 30 can be selectively energized or otherwise supplied with power from the primary distribution power bus 22 by way of an independent primary distribution switch 40. As shown, the primary power distribution node 16 can include a set of primary power distribution switches 40. The output of each respective primary power distribution switch 40 can be connected with a secondary distribution power bus 42 of a respective secondary power distribution node 30, to energize or supply power to the respective secondary distribution power bus 42.

Each secondary power distribution node 30 can further include a set of secondary distribution switches 44 connected to a respective set or subset of electrical loads 20. A shown, each electrical load 20 can be selectively energized by the secondary distribution power bus 42 by way of the respective secondary distribution switch 44. In this sense, each electrical load 20 can be independently controllably or energizable, by way of the respective secondary distribution switch 44. Also, as shown, at least a set or subset of the electrical loads 20 for at least one of the secondary power distribution nodes 30 can include at least one enabled electrical load 48, as defined herein. The electrical loads 20 are further shown having at least one typical or conventional electrical load 46, which is not utilized during an idle state, as described herein. Non-limiting aspects of the disclosure can be included wherein at least a subset of the enabled electrical loads 48 are operable in by consuming a constant power over a period of time. I another non-limiting aspect of the disclosure, at least a subset of the enabled electrical loads 48 are temporarily operable, such as for interval periods of time. The temporarily operable state of the subset of the enabled electrical loads 48 can be periodic, or in response to commands to operate on-demand, for example. A combination of operable and temporarily operable subsets of the enabled electrical loads 48 can be included.

During non-idle states of the power distribution system 50, the power distribution system 50 can be energized or otherwise supplied by the generator 18, by way of an operating turbine engine, and connectable with the primary power distribution node 16 by way of the generator switch 36. The power distribution system 50 can distribute the power through the primary power distribution node 16, the secondary power distribution nodes 30, or a subset thereof, to the set of electrical loads 20, 46, 48, as needed based on operational demands of the system 50. Non-limiting aspects of the disclosure can further be included wherein the supplemental power unit 32 can further energize or otherwise supply power to primary power distribution node 16, or supplement the power supplied by the generator 18, by way of the supplemental power unit switch 38. The supplemental power unit 32 can additionally or alternatively be rechargeable by power supplied by way of the generator 18, for example, by way of the primary distribution power bus 22.

During idle states of the power distribution system 50, as described herein, the generator 18 would not typically be operation, and consequently, would not typically supply power or otherwise energize the primary power distribution node 16, or any downstream secondary power distribution nodes 30 or electrical loads 20. Non-limiting aspects of the disclosure can be included wherein, for example, the supplemental power unit 32 can operably supply at least a portion of power to the power distribution system 50 to meet the power demands of at least one enabled electrical load 48, or a set of enabled electrical loads 48, as defined herein. Non-limiting aspects of the disclosure can further be included wherein the supplemental power unit 32 can operably supply at least a portion of power to the power distribution system 50 to meet the further power demands of a subset of conventional electrical loads 46, a subset of enabled electrical loads 48, a subset of secondary power distribution nodes 30, a combination thereof, or the like.

During the idle states, operating the respective set of primary distribution switch 40, the respective set of secondary distribution switches 44, subsets thereof, or the like, will consume power from the supplemental power unit 32. Even in instances where, for example, the various sets or subsets of switches 36, 38, 40, 44 are operably in an open state (e.g. a non-conducting mode), leakage currents can be conducted through or across the sets or subsets of switches 36, 38, 40, 44 that otherwise are difficult to avoid. When utilizing solid state devices in the switching operations, the leakage currents can summate to a large power dissipation or consumption of power over a period of time. As explained, since the supplemental power unit 32 is a limited power supply, excess consumption of power will discharge the supplemental power unit 32 faster, compared with less consumption of power by switching operations, while enabling or otherwise energizing the set or subset of enabled electrical loads 48. In one non-limiting example for illustration, an aircraft power distribution system can include a hierarchical switch topology that distributes power to thousands of electrical loads. In this example, a thousand (or more) switches, each consuming even a small leakage current in the open non-conducting state, would summate to a much larger overall power consumption.

Figure 3:
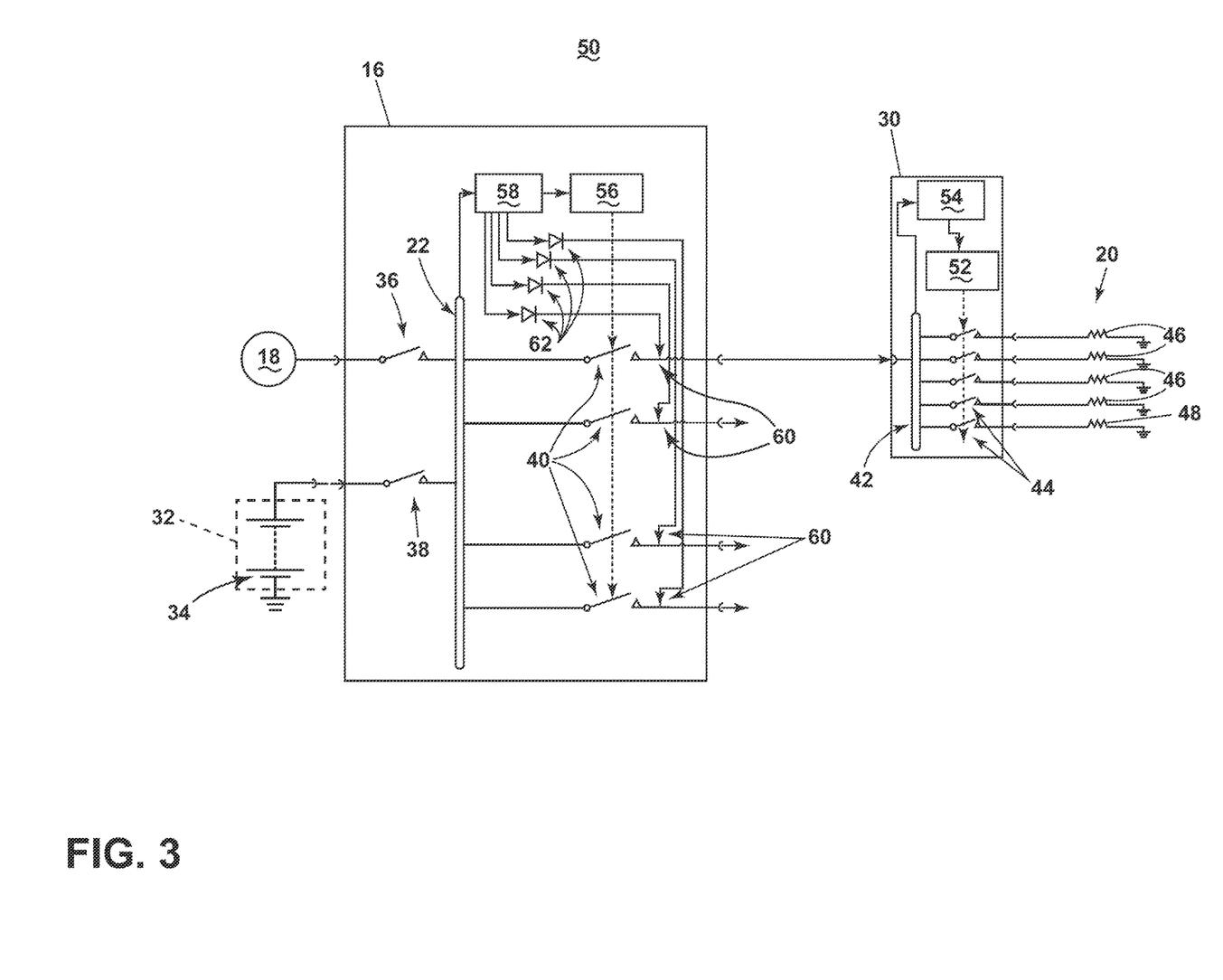
FIG. 3 is a further detailed schematic view of the power distribution system of the aircraft of FIG. 2, in accordance with various aspects described herein.

FIG. 3 illustrates a further detailed schematic view of the power distribution system of the aircraft of FIG. 2. As illustrated, only a single secondary power distribution node 30 is shown for brevity and ease of understanding, but aspects of the disclosure are applicable to each, or a subset of, the secondary power distribution nodes 30.

As shown, aspects of the disclosure can be included wherein the primary power distribution node 16 further includes a primary distribution node power source 58 connected with and adapted to receive a first power from the primary distribution power bus 22. The primary distribution node power source 58 can further be connected with each respective output connected or otherwise connectable with each respective secondary power distribution node 30. In this sense, the primary distribution node power source 58 can supply a second power to a set of outputs 60, each output 60 electrical downstream of a respective primary distribution switch 40, and upstream of the respective secondary power distribution node 30. In one non-limiting example, the set of outputs 60 can be electrically in line with a respective diode 62 enabling unidirectional power supplying from the primary distribution node power source 58 to the set of outputs 60. In another non-limiting aspect of the disclosure, the second power can be less than or lower than the first power, can meet a power demand for the downstream components, or a combination thereof.

Also, as shown, non-limiting aspects of the disclosure can include a controller module 56 of the primary power distribution node 16, or associated with the primary power distribution node 16, and communicatively connected with the primary distribution node power source 58, and operably connected with each respective primary distribution switch 40. In this sense, the controller module 56 can enable, enforce, operation, or otherwise control the independent or common operation of the set or a subset of the primary distribution switches 40. As used herein, the controller module 56 can include a processor and memory. In non-limiting aspects of the disclosure, the controller module 56 can be further connected with additional power distribution controller modules to operate a power distribution system 50 control schema. The additional power distribution controller modules can include local control modules, networked control modules, remote control modules that can provide commands and instructions from a remote location away from the power distribution system 50, or a combination thereof.

The secondary power distribution node 30 is further shown including a secondary distribution node power source 54 communicatively connected with a controller module 52 of the secondary power distribution node 30, and operably connected with each respective secondary distribution switch 44. In this sense, the controller module 52, which can be similar to the controller module 56 of the primary power distribution node 16, can enable, enforce, operation, or otherwise control the independent or common operation of the set or a subset of the secondary distribution switches 44.

During non-idle states or periods of operation of the power distribution system 50, aspects of the primary power distribution node 16, secondary power distribution nodes 30, or a combination thereof, may not differ from conventional power distribution system 50 operations. For example, the primary distribution power bus 22 can supply power to the primary distribution node power source 58, which can in turn supply power to the controller module 56 to operate switching operations for the primary power distribution node 16, as needed. Similarly, and energized secondary power distribution node 30 includes an energized secondary distribution power bus 42, which can supply power to the secondary distribution power source 54. The secondary distribution power source 54 can in turn supply power to the controller module 52 to operate switching operations for the secondary power distribution node 30, as needed.

During idle states or periods of operation, however, when only a limited number of enabled electrical loads 48 are designated to be energized, aspects of the disclosure can operably enable a low power consumption or low power dissipation power distribution system 50. For example, during an idle state, the primary distribution power bus 22 can be energized by or receive power from the supplemental power unit 34. In turn, the primary distribution power bus 22 can energize or further supply power to the primary distribution node power source 58. The primary distribution node power source 58 can selectively, independently, or operably supply power to respective outputs 60, as needed, as well as to supply power to the controller module 56 to operate switching operations for the primary power distribution node 16, as needed.

In one non-limiting example, a respective secondary power distribution node 30 that does not include any active or enabled electrical loads 48 would not typically receive power from the primary power distribution node 16, such that the connecting primary distribution switch 40 would be set to an open non-conducting state, for example, by the controller module 56. This would otherwise result in leakage current being dissipated through the open non-conductive switch 40, as explained herein.

Non-limiting aspects of the disclosure can be included wherein, for example, the primary distribution node power source 58 enables, supplies, or provides a low voltage to the respective output 60 associated with the secondary power distribution node 30 without any active or enabled electrical loads 48. As used herein, a "low voltage" is a voltage less than the typical voltage supplied by the power supply during normal (non-idle) power distribution system 50 operations (i.e. a "high voltage"). In one non-limiting example, if the typical voltage supplied from the primary power distribution node 16 to the secondary power distribution node 30 was 270 Volts direct current (DC) during a non-idle state, a respectively "low voltage" could be an order of magnitude smaller, such as 10 Volts DC or 30 Volts DC, or the like.

Operably, by supplying a low voltage to the respective output 60 associated with the secondary power distribution node 30 without any active or enabled electrical loads 48, the amount of leakage current dissipated by the respective open non-conductive switch 40 would be reduced. Furthermore, non-limiting aspects of the disclosure can be included wherein at least one of the low voltage supplied by the primary distribution node power source 58 to the secondary power distribution node 30, or the controller module 52 of the secondary power distribution node 30, can be configured or selected such that the controller module 52 can be operable in response to the low voltage (supplied by way of the secondary distribution power bus 42 to the secondary distribution node power source 54). In this sense, the controller module 52 can be "active" due to a regular power supply, even in idle states of the power distribution system 50. This "active" state, which for example, can include a "sleep" state, a "standby" state, or a low power consumptions state, and can allow the controller module 52 to remain alert in case of monitoring or other operative tasks that may occur in a periodic, temporary, on-demand, or otherwise irregular operation, as opposed to continuous operation(s). Additional non-limiting examples can include remote activation of the controller module 52 in the sleep or standby state, such as by way of networked operations or commands, "wake on local area network (LAN)" commands, or the like. This can reduce a delay in power-up, power-on, start-up, boot-up routines, or the like, and result in an overall more-responsive system, compared to if the controller module 52 was otherwise inactive. Starting up a controller module can take an appreciable amount of time, and delay implementing any commands from the controller module. In this sense, enabling the powering of the controller module 52 can be included as an enabled electrical load 48, such that the low power operation of the controller module 52 is desirable, even during the idle state.

Non-limiting aspects of the disclosure can be further included wherein, for example, the primary power distribution node 16 operably supplies power or otherwise energizes the respective secondary power distribution nodes 30 with any active or enabled electrical loads 48. In this sense, the power distribution system 50 can identify or otherwise account for a subset of the electrical loads 20, such as the active or enable electrical loads 48 that are operable or energized during the idle state, and can, for example, control the respective primary distribution switch 40 to close or operate in a conductive state, to energize the secondary power distribution node 30, which can further distribute the power to the active or enabled electrical load(s) 48.

Thus, non-limiting aspects of the disclosure can be included the power distribution system 50 is operable in an idle or low power consumption state, wherein secondary power distribution nodes 30 with enabled electrical loads 48 are energized as needed, and wherein secondary power distribution nodes 30 without enabled electrical loads 48 can be switchably disabled, and powered by a low voltage that reduces power consumption or power dissipation otherwise due to leakage currents through the respective set of open or non-conducting switches.

Figure 4:
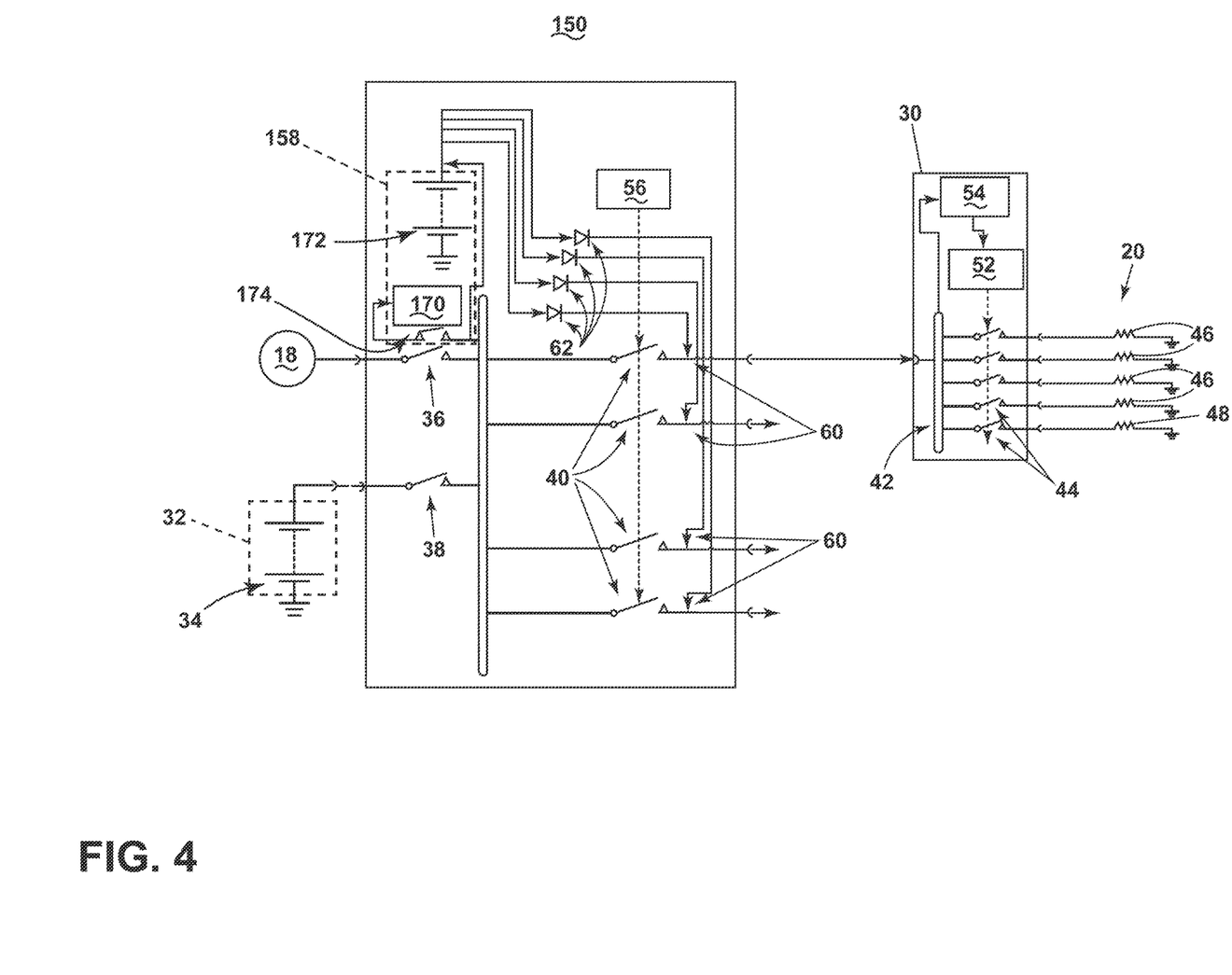
FIG. 4 is another schematic view of a power distribution system, in accordance with various aspects described herein.

FIG. 4 another power distribution system 150 according to another aspect of the present disclosure. The power distribution system 150 is similar to the power distribution system 50; therefore, like parts will be identified with like numerals increased by 100, with it being understood that the description of the like parts of the power distribution system 50 applies to the power distribution system 50, unless otherwise noted. One difference is that the primary distribution node power source 158 can further include a separate and independent power supply 172, shown in one example to include a set of batteries, or a set of low voltage batteries. In this sense, the primary power distribution power source 158 can independently supply power to the respective set of outputs 60, as described, without the primary distribution power bus 22 being energized, by, for instance, the supplemental power unit 32.

Also, as shown, the primary distribution power source 158 can include a recharging controller 170 connectable with the independent power supply 172 and the primary distribution power bus 22 by way of a recharging switch 174. In this sense, upon discharge of the independent power supply 172, the independent power supply 172 can be selectively recharged by way of the primary distribution power bus 22 (via the recharging switch 174), which can further be temporarily energized by the supplemental power unit 32 or the generator 18 (if available). Once recharging of the primary distribution power source 158 is completed, the recharging switch 174 can be controllably opened, as can the supplemental power unit 32, if desired.

Figure 5:
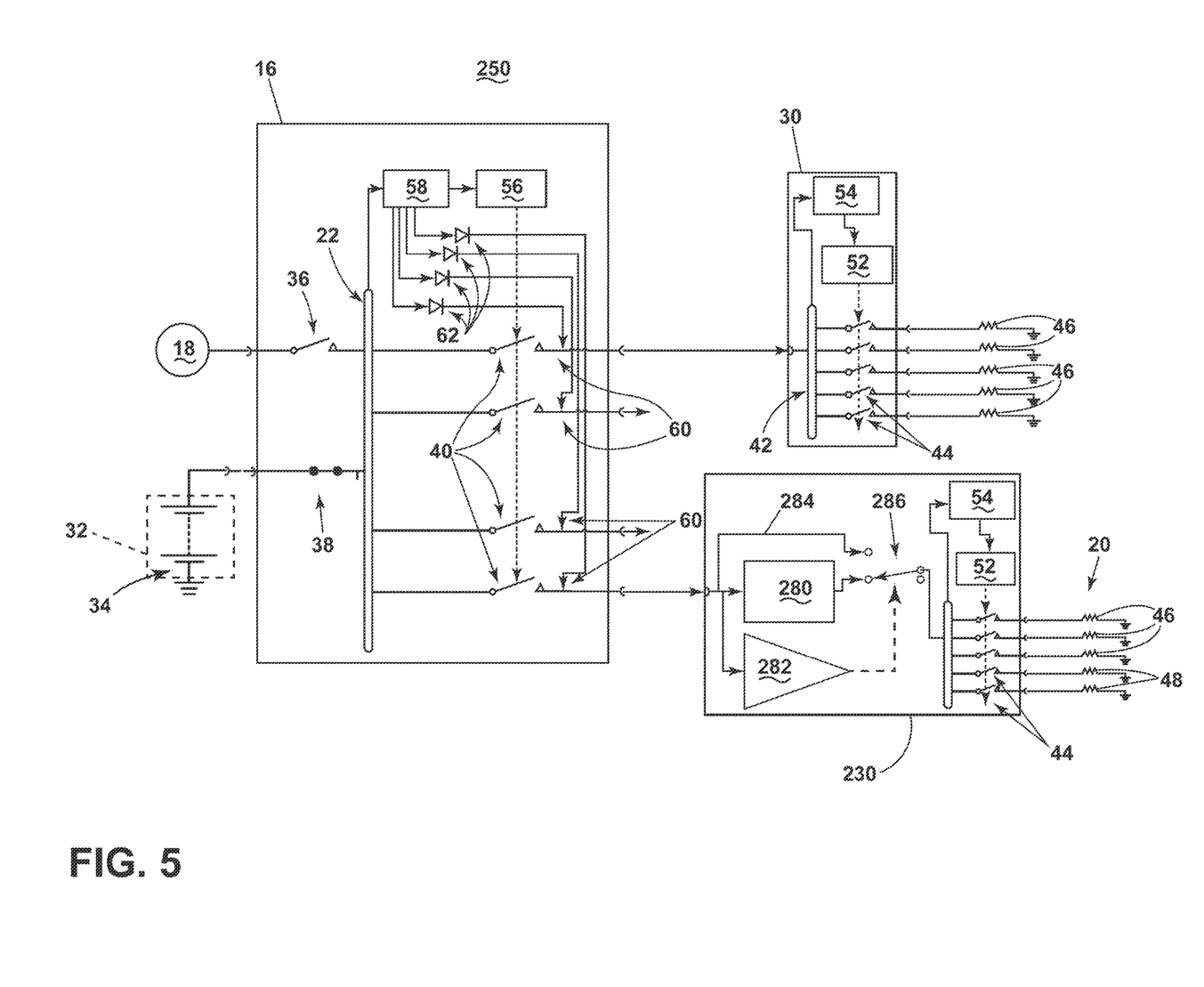
FIG. 5 is yet another schematic view of a power distribution system, in accordance with various aspects described herein.

FIG. 5 another power distribution system 250 according to another aspect of the present disclosure. The power distribution system 250 is similar to the power distribution system 50; therefore, like parts will be identified with like numerals increased by 200, with it being understood that the description of the like parts of the power distribution system 50 applies to the power distribution system 250, unless otherwise noted. One difference is that the secondary power distribution node 230 can selectively operate to supply different voltages based on the current operating condition.

As shown, the output of the respective primary distribution switch 40 is received in the secondary power distribution node 230 by components in parallel. The parallel components can include a conductor 284 that passes the input received to a first output, a voltage converter 280, such as a high voltage to low voltage converter, which converts high voltage received at the input to a lower relative voltage supplied to a second output, and a voltage control 282 that operably controls a voltage controlled switch 286 connectable to either the first output or the second output, and further connected with the secondary distribution power bus 42. The secondary power distribution node 230 is operable in response to receiving a high voltage, such as voltage supplied by the primary power distribution node 16 during idle state power distribution system 250 operation. In this example, the voltage controller 282 can sense the high voltage received at the parallel input, and operate the voltage controlled switch 286 to connect the output of the voltage converter 280 with the secondary distribution power bus 42.

In another example, the secondary power distribution node 230 is operable in response to receiving a low voltage, such as voltage supplied by the primary power distribution node 16 during idle state power distribution system 250 operation (e.g. as shown and explained with reference to FIG. 3, FIG. 4, or a combination thereof). In this example, the voltage controller 282 can sense the low voltage received at the parallel input, and operate the voltage controlled switch 286 to connect the output of the conductor 284 with the secondary distribution power bus 42, passing the low voltage to the secondary distribution power bus 42. In non-limiting examples wherein the enable electrical load(s)

48 are operable under a low voltage, aspects of the disclosure can operably allow for the powering of these enabled electrical load(s) 48 by the secondary power distribution nod 230. In this sense, the low voltage supplied by the primary distribution node power source 58 to the secondary power distribution node 230 can be selected or matched with the power demands of the enabled electrical loads 48.

Thus, aspects of the disclosure can be included to define a method of reducing leakage current in a power distribution system 50, 150, 250. The method of reducing leakage current can include first identifying a subset of electrical loads 20 desired to be energized during an idle state of the power distribution system 50, 150, 250, defining a set of enabled electrical loads 48. Next the method can include identifying a subset of secondary power distribution nodes 30, 230 not associated with or not powering any active or enabled electrical loads 48. The method then procedures to operably or switchably disconnecting the subset of secondary power distribution nodes 30, 230 from a limited power supply, such as at least one of the supplemental power unit 32 or the primary distribution power source 158, by way of opening a primary distribution switch 40 positioned in a primary power distribution node 16 upstream of the subset of secondary power distribution nodes 30, 230. Finally, the method continues by supplying a low voltage power supply to the output 60 of the opened primary power distribution switch 40, wherein the low voltage power supply reduces leakage current across the primary distribution switch 40.

The sequence described is for non-limiting example purposes only and is not meant to limit the method in any way as it is understood that the portions of the method can proceed in a different logical order, additional or intervening portions can be included, or described portions of the method can be divided into multiple portions, or described portions of the method can be omitted without detracting from the described method. For example, non-limiting aspects of the disclosure can be included further comprising identifying a second subset of secondary power distribution nodes 30, 230 associated with at least a subset of the enabled electrical loads 48, and switchably connecting the second subset of secondary power distribution nodes 30, 230 with the limited power supply, such as the supplemental power unit 32 or the primary distribution power source 158, to operably energize the subset of the enabled electrical loads 48.

In additional or alternative non-limiting aspects of the disclosure, the method can be included wherein the subset of enabled electrical loads 48 includes at least one of a monitoring load, and security monitoring load, a power-operated door load, or a lighting load. In yet another non-limiting aspect of the disclosure, the method can be included wherein the subset of secondary power distribution nodes 30, 230 further includes a controller module 52 configured to controllably operate switching operations of each respective secondary power distribution node 30, 230, and wherein the supplied low voltage power supply is sufficient to operate the controller module 52, such as in a lower power consumption standby or sleep mode. In yet another non-limiting aspect of the disclosure, the method can be included, wherein the limited power supply includes a dischargeable power supply.

Many other possible aspects and configurations in addition to that shown in the above figures are contemplated by the present disclosure. The aspects disclosed herein provide a method and power distribution system operable in a low power dissipation or low power consumption state, such as an idle state. The technical effect is that the above described aspects enable the power distribution system to be able to distribute and control power to a large number of electrical loads using solid state technology with minimal current leakage, while maintaining a rapid response to changing power demands.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A power distribution system, comprising a primary power distribution node defining a set of primary distribution switches, each having an output and operable in a first conducting mode and a second non-conducting mode, and wherein operating in the second non-conducting mode includes a leakage current through the power distribution switch, and including a primary power distribution node power source configured to receive a first power, and supply a second power to an output, the second power less than the first power, and a controller module associated with the primary power distribution node and configured to identify a subset of electrical loads desired to be energized during an idle state of the power distribution system, defining a set of enabled electrical loads, identify a subset of secondary power distribution nodes not associated with any of the set of enabled electrical loads, switchably disconnect the subset of secondary power distribution nodes from a limited power supply, by way of opening a subset of the primary distribution switches positioned in a primary power distribution node upstream of the respective subset of secondary power distribution nodes, and supply the second power to the output of the opened primary power distribution switch, wherein the second power reduces leakage current across the respective primary distribution switch.

The power distribution system of any preceding clause wherein second power is a lower voltage than the first power.

The power distribution system of any preceding clause wherein the second power limits the leakage current through the primary distribution switch.

The power distribution system of any preceding clause wherein the power distribution node power source is the limited power supply.

The power distribution system of any preceding clause wherein the set of enabled electrical loads includes an always-on electrical load.

The power distribution system of any preceding clause wherein the first power is 270 Volts direct current (DC) and the second power is 28 Volts DC.

The power distribution system of any preceding clause, further comprising a first power source and a second dischargeable power source, and wherein the power distribution system is operable in a normal power mode when the first power supplied is supplied by way of the first power source, and further operable in a low power mode when the first power supplied is supplied by way of the second dischargeable power source, wherein the low power mode consumes less power than the normal power mode.

The power distribution system of any preceding clause wherein the second power is sufficient to operably enable another controller module in a standby mode.

The power distribution system of any preceding clause wherein the first power is supplied to the primary power distribution node.

The power distribution system of any preceding clause wherein the first power is supplied by a dischargeable power source.

The power distribution system of any preceding clause wherein the set of primary distribution switches include a set of solid state switches.

An aircraft comprising the power distribution system of any preceding clause.

The aircraft of any preceding clause, wherein the set of enabled electrical loads includes at least one of a monitoring load, a security monitoring load, a power-operated door load, or a lighting load.

The aircraft of any preceding clause wherein the second power limits the leakage current through the subset of the primary distribution switches during a period of inactivity wherein the first power is supplied by a dischargeable power source.

A method of reducing leakage current in a power distribution system, comprising identifying a subset of electrical loads desired to be energized during an idle state of the power distribution system, defining a set of enabled electrical loads, identifying a subset of secondary power distribution nodes not associated with any of the set of enabled electrical loads, switchably disconnecting the subset of secondary power distribution nodes from a limited power supply, by way of opening a primary distribution switch positioned in a primary power distribution node upstream of the subset of secondary power distribution nodes, and supplying a low voltage power supply to the output of the opened primary power distribution switch, wherein the low voltage power supply reduces leakage current across the primary distribution switch.

The method of any preceding clause, further comprising identifying a second subset of secondary power distribution nodes associated with at least a subset of the enabled electrical loads, and switchably connecting the second subset of secondary power distribution nodes with the limited power supply to operably energize the subset of the enabled electrical loads.

The method of any preceding clause, wherein the subset of enabled electrical loads includes at least one of a monitoring load, and security monitoring load, a power-operated door load, or a lighting load.

The method of any preceding clause, wherein the subset of secondary power distribution nodes further includes a controller module configured to controllably operate switching operations of each respective secondary power distribution node, and wherein the supplied low voltage power supply is sufficient to operate the controller module.

The method of any preceding clause, wherein the supplied low voltage power supply is sufficient to operate the controller module in a low power consumption standby mode.

A power distribution system, comprising a primary power distribution node defining a set of primary distribution switches, each having an output and operable in a first conducting mode and a second non-conducting mode, and wherein operating in the second non-conducting mode includes a leakage current through the power distribution switch, and including a primary power distribution node power source configured to receive a first power, and supply a second power to an output, the second power less than the first power, a first secondary power distribution node including at least one enabled electrical load operable in a low power consumption mode of the power distribution system, the first secondary power distribution node connectable to the primary power distribution node by a first primary distribution switch, and a second secondary power distribution node not associated without any enabled electrical loads operable in the low power consumption mode of the power distribution system, the second secondary power distribution node connectable to the primary power distribution node by a second primary distribution switch, wherein, in response to the power distribution system operating in the low power consumption mode, the second secondary power distribution node is selectively disconnected from a power distribution system power source, and wherein the primary power distribution node power source supplies the second power to the second secondary power distribution node to operably reduce the leakage current through the second primary distribution switch.

What is claimed is:

1. A power distribution system, comprising:
   a primary power distribution node defining a set of primary distribution switches, each having an output and operable in a first conducting mode and a second non-conducting mode, and wherein operating in the second non-conducting mode includes a leakage current through the power distribution switch, and including a primary power distribution node power source configured to receive a first power, and supply a second power to an output, the second power less than the first power; and
   a controller module associated with the primary power distribution node and configured to:
   identify a subset of electrical loads desired to be energized during an idle state of the power distribution system, defining a set of enabled electrical loads;
   identify a subset of secondary power distribution nodes not associated with any of the set of enabled electrical loads;
   switchably disconnect the subset of secondary power distribution nodes from a limited power supply, by way of opening a subset of the primary distribution switches positioned in a primary power distribution node upstream of the respective subset of secondary power distribution nodes; and
   supply the second power to the output of the opened subset of the primary power distribution switches, wherein the second power reduces leakage current across the respective primary distribution switch.

2. The power distribution system of claim 1 wherein second power is a lower voltage than the first power.

3. The power distribution system of claim 2 wherein the second power limits the leakage current through the opened subset of the primary distribution switches.

4. The power distribution system of claim 1 wherein the power distribution node power source is the limited power supply.

5. The power distribution system of claim 1 wherein the set of enabled electrical loads includes an always-on electrical load.

6. The power distribution system of claim 1 wherein the first power is 270 Volts direct current (DC) and the second power is 28 Volts DC.

7. The power distribution system of claim 1, further comprising a first power source and a second dischargeable power source, and wherein the power distribution system is operable in a normal power mode when the first power supplied is supplied by way of the first power source, and further operable in a low power mode when the first power supplied is supplied by way of the second dischargeable power source, wherein the low power mode consumes less power than the normal power mode.

8. The power distribution system of claim 1 wherein the second power is sufficient to operably enable another controller module in a standby mode.

9. The power distribution system of claim 1 wherein the first power is supplied to the primary power distribution node.

10. The power distribution system of claim 1 wherein the first power is supplied by a dischargeable power source.

11. The power distribution system of claim 1 wherein the set of primary distribution switches include a set of solid state switches.

12. An aircraft comprising the power distribution system of claim 1.

13. The aircraft of claim 12, wherein the set of enabled electrical loads includes at least one of a monitoring load, a security monitoring load, a power-operated door load, or a lighting load.

14. The aircraft of claim 12 wherein the second power limits the leakage current through the subset of the primary distribution switches during a period of inactivity wherein the first power is supplied by a dischargeable power source.

15. A method of reducing leakage current in a power distribution system, comprising:
identifying a subset of electrical loads desired to be energized during an idle state of the power distribution system, defining a set of enabled electrical loads;
identifying a subset of secondary power distribution nodes not associated with any of the set of enabled electrical loads;
switchably disconnecting the subset of secondary power distribution nodes from a limited power supply, by way of opening a primary distribution switch positioned in a primary power distribution node upstream of the subset of secondary power distribution nodes; and
supplying a low voltage power supply to the output of the opened primary power distribution switch, wherein the low voltage power supply reduces leakage current across the primary distribution switch.

16. The method of claim 15, further comprising identifying a second subset of secondary power distribution nodes associated with at least a subset of the enabled electrical loads, and switchably connecting the second subset of secondary power distribution nodes with the limited power supply to operably energize the subset of the enabled electrical loads.

17. The method of claim 16, wherein the subset of enabled electrical loads includes at least one of a monitoring load, and security monitoring load, a power-operated door load, or a lighting load.

18. The method of claim 15, wherein the subset of secondary power distribution nodes further includes a controller module configured to controllably operate switching operations of each respective secondary power distribution node, and wherein the supplied low voltage power supply is sufficient to operate the controller module.

19. The method of claim 18, wherein the supplied low voltage power supply is sufficient to operate the controller module in a low power consumption standby mode.

20. A power distribution system, comprising:
a primary power distribution node defining a set of primary distribution switches, each having an output and operable in a first conducting mode and a second non-conducting mode, and wherein operating in the second non-conducting mode includes a leakage current through the power distribution switch, and including a primary power distribution node power source configured to receive a first power, and supply a second power to an output, the second power less than the first power;
a first secondary power distribution node including at least one enabled electrical load operable in a low power consumption mode of the power distribution system, the first secondary power distribution node connectable to the primary power distribution node by a first primary distribution switch; and
a second secondary power distribution node not associated without any enabled electrical loads operable in the low power consumption mode of the power distribution system, the second secondary power distribution node connectable to the primary power distribution node by a second primary distribution switch;
wherein, in response to the power distribution system operating in the low power consumption mode, the second secondary power distribution node is selectively disconnected from a power distribution system power source, and wherein the primary power distribution node power source supplies the second power to the second secondary power distribution node to operably reduce the leakage current through the second primary distribution switch.

* * * * *